March 28, 1944.  G. B. ROESCH  2,345,290
SEDIMENT DETECTOR
Filed Feb. 5, 1942  2 Sheets-Sheet 1
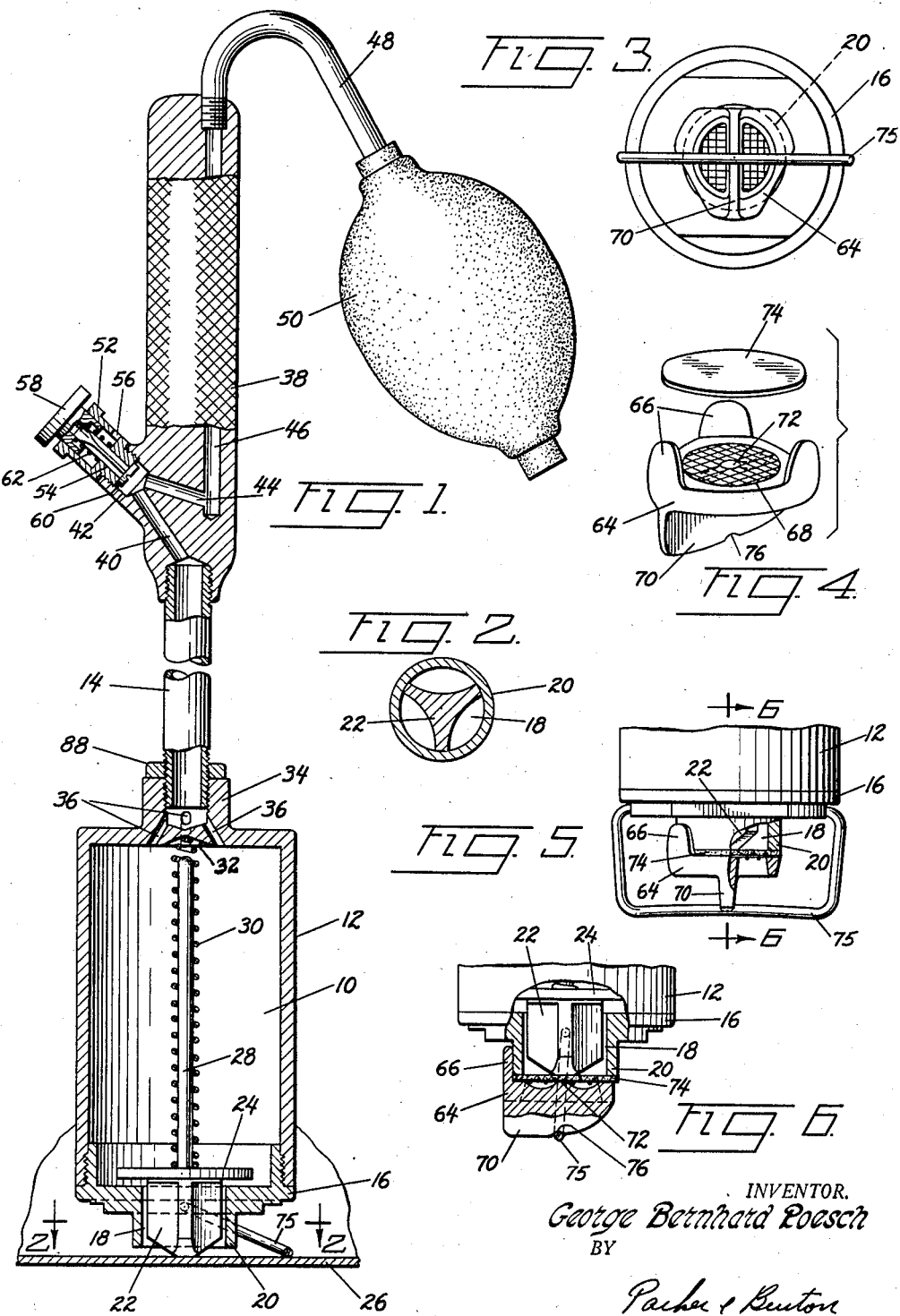
INVENTOR.
George Bernhard Roesch
BY
Parker & Burton
ATTORNEYS

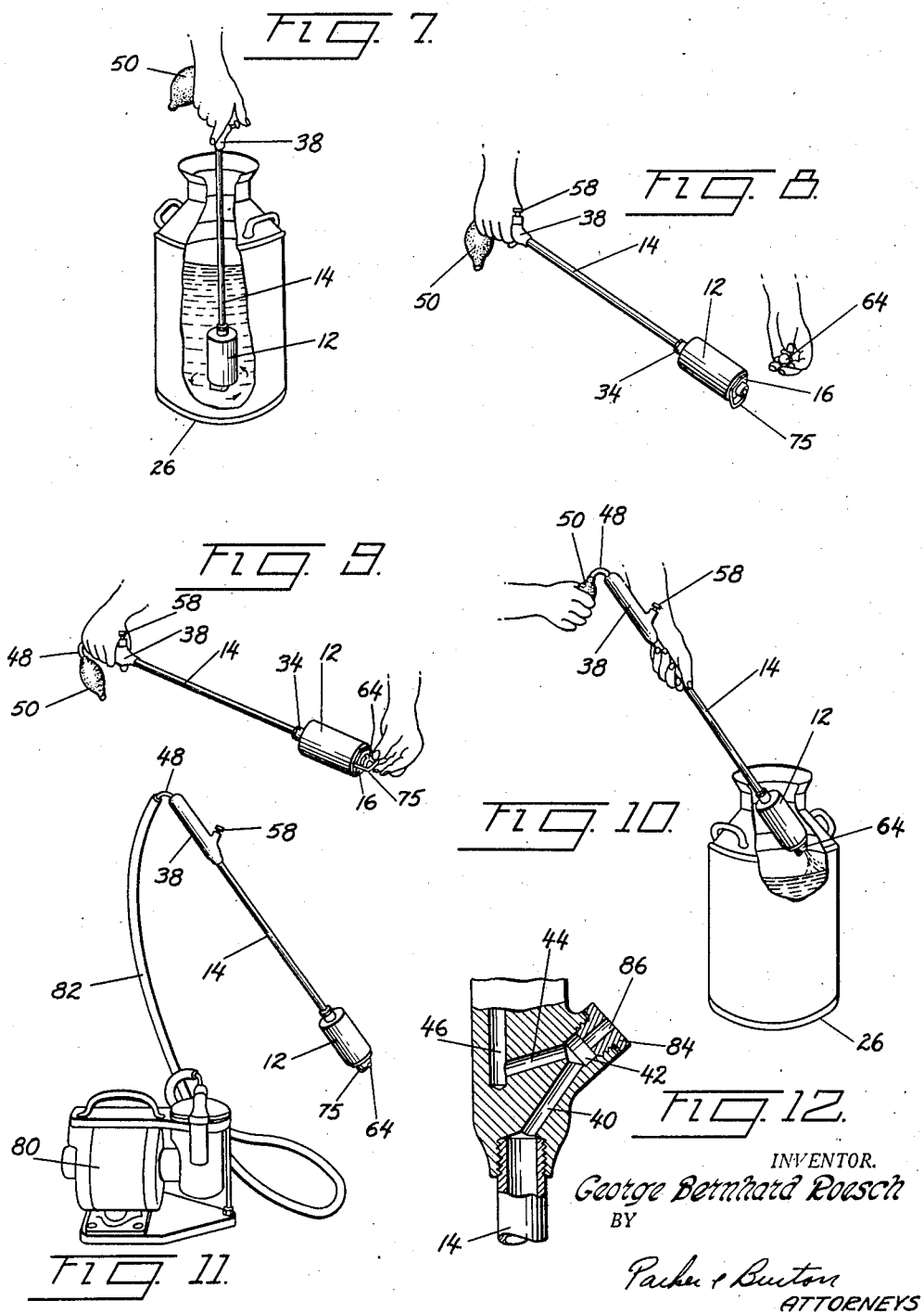

Patented Mar. 28, 1944

2,345,290

UNITED STATES PATENT OFFICE 2,345,290

SEDIMENT DETECTOR

George Bernhard Roesch, Adrian, Mich.

Application February 5, 1942, Serial No. 429,595

3 Claims. (Cl. 73—51)

This invention relates to liquid testing devices and particularly to a device especially designed for testing milk.

An important object of this invention is to provide novel testing equipment which constitutes an improvement to the testing device described in the United States patent to Philip V. O'Hara, No. 1,518,160. Another object of the invention is to provide testing equipment of this character which functions speedily, accurately and hygienically to determine the presence of impurities in milk. The invention is particularly adapted for health inspectors, milk distributors, manufacturers of cheese and other dairy products.

More particularly, it is an important object of this invention to provide an improved device for testing milk to determine its sediment content, which device is adapted for manual or power use and which is provided with novel control means for effecting operation, whichever method is employed. A further object of this invention is to provide a novel valve release which enables the inspector to simultaneously grip the upper end of the device with one hand and use the fingers of the hand to operate a valve to fill the collecting chamber. A still further object of the invention is to provide an improved combination valve and filter pad holder which permits the inspector to quickly attach and detach the filter pad in a few seconds. The testing device is speedy in operation and will not interrupt the routine of milk cans continuously advanced on conveyors. The tested milk is returned to the same can from which it is withdrawn.

Various objects, advantages and meritorious features will become more fully apparent from the following specification, appended claims, and accompanying drawings, wherein:

Figure 1 is a longitudinal sectional view through a testing device embodying the invention, Fig. 2 is a sectional view through the milk inlet valve and filter pad assembly along line 2—2 of Fig. 1, Fig. 3 is a plan view of the filter pad assembly on the bottom end of the device, Fig. 4 is a perspective view illustrating the method of assembling the filter pad in operating position on its holder, Fig. 5 is a side view of the bottom end of the milk collecting chamber showing the filter pad in operating position, Fig. 6 is a sectional view through the filter pad holder assembly along line 6—6 of Fig. 5, Fig. 7 is a view illustrating the first step in operating the testing device, Figs. 8 and 9 are views showing the steps of applying the filter pad to the end of the device after it has been withdrawn from the milk can, Fig. 10 is a view showing the return of the milk in the collecting chamber to the original milk can through the filter pad, Fig. 11 is a side view of an air compressor unit, showing its method of attachment to the testing device to provide an alternative form of operating the device, and Fig. 12 is a detail sectional view of a modified form of valve control for use with the air compressor unit.

The embodiment of the invention illustrated in the drawings is a milk sediment tester including a milk receiving chamber 10 formed by a tubular container 12 and having projecting from the top end thereof a hollow rod or pipe like member 14. The bottom side of the container 12 is opened and threaded thereto in fluid tight manner is a plate 16 having a central opening 18 therein. Plate 16 is provided with a downwardly projecting circular flange 20 surrounding the opening 18. Opening 18 serves as the sole inlet for the admission of milk into the chamber 10 and discharges therefrom as will be more fully described hereinafter.

A valve 22 is provided for controlling the opening 18, and includes a widened part or flange 24 which seats upon the inside margin of the opening 18 to close the opening against the admission and discharge of milk. Valve 22 is so constructed that it projects outwardly through the opening 18 in spaced relationship to the side walls thereof and beyond the circular flange 20 so that it may be pressed against any outside surface such as the bottom of a milk can 26 illustrated in Fig. 1. Attached to the valve 22 and projecting upwardly into the chamber 10 is a valve stem 28 which terminates just short of the upper end of the container 12. Surrounding this valve stem is a coiled spring 30 seated at one end upon the bottom 24 of the valve and at the other end in a recess 32 in the top of the container. It is obvious that the coil spring 30 exerts a yielding pressure on the valve member tending to force it against the seat and close the opening 18.

The lower end of the hollow rod 14 is externally threaded for engagement in boss 34 projecting from the top end of the container 12. Extending from the interior of the boss 34 to the chamber 10 are passages 36 which radiate downwardly in order to avoid the recess 32 in which the spring 30 seats. These passages open communication between the interior of the rod 14 and the chamber 10. The upper end of the rod 14 is externally threaded for engagement in a hand grasping part 38 which forms an extension of the rod 14. Preferably the outside surface of the hand grasping part is knurled or otherwise given a rough finish to facilitate handling.

Formed in the part 38 which is grasped by the hand of the operator are passages which open communication with the hollow interior of the rod 14. These passages are formed in a novel way to vent the interior of the rod 14 to atmosphere. As shown in Fig. 1 a passage 40 communicates with the top of the rod 14 and leads upwardly therefrom at an angle and enters a widened passage 42 in a boss formed integrally on one side of the part 38. Also entering the widened passage 42 is a transverse passage 44 which communicates with the bottom end of a vertical passage 46 which opens out through the top of the part 38. Fitted into the upper end of the passage 46 is a tube 48 communicating with a collapsible bulb 50 which is of customary construction for forcing air therefrom through the tube 48 when squeezed by the hand.

A fitting 52 is threaded in the widened passage 42 of the part 38. This fitting is axially bored at 54 to provide a passage extending from the widened passage 42 to the outside of the part 38. A vent 56 is provided for this purpose. A valve member 58 is reciprocably mounted in the fitting and has a valve stem passing through the bore 54 carrying a head 60 operating in the widened passage 42. The valve stem is constructed in any suitable way to allow flow of air from the widened passage 42 to the vent 56. The valve head 60 however will in the raised position of the valve lie across the inner end of the bore 54 and block escape and entrance of air. A coil spring 62 yieldingly urges the valve to raised position where head 60 cuts off the flow of air. When the valve is depressed such as by one of the fingers of the hand grasping the handle 38, the head will move away from the end of the bore 54 and vent the pipe 14 to atmosphere.

A filter pad holder which is adapted to be removably attached to the bottom side of the container 12 is illustrated generally at 64 in Fig. 4. This holder is of such a size that it will fit the bottom end of the circular flange 20 on the container and is provided with upstanding fingers 66 which slip past the side of the flange 20 as shown in Fig. 5 to locate the holder in centered position. The holder is provided with a central aperture 68 over which extends a screen. Depending from the holder is a transverse rib 70 having its bottom side shaped in the formation of a cam face. The upper end of the rib extends across the opening 68 closely adjacent to the screen and at the center point of the screen is provided with a raised platform 72 which, as will be more fully described later will abut the lower end of the valve member 22. Preferably the screen across the opening 68 is cut out at the center so that the platform 72 is freely exposed therethrough. It is also desirable to cut back the top side of the rib 70 adjacent the screen at all points except at the center, at the platform 72 as shown in Figs. 4 and 6. A filter pad which is held by the holder 64 is shown at 74. It seats within the fingers 66 and when the holder is in position as shown in Figs. 5 and 6 it will overlie the bottom edge of the flange 20 of the container.

The filter pad holder 64 is removably attached to the bottom end of the flange 20 by manually bringing the holder with a filter pad contained therein up against the bottom side of the container and around the opening 18. This will cause the bottom end of the valve to engage the filter pad opposite to the raised platform 72. Pressure exerted by the latter will raise and unseat the valve 22, opening communication between the chamber 10 and the outside. To secure the holder in position there is attached means which will ride over the cam face of the rib 70 and force the holder upwardly into tight engagement with the bottom of the container. This means comprises a wire member 75 shaped in the form of a rectangle and having its upper ends hinged to the bottom side of the container on a transverse axis so that the wire member may swing to and fro below the opening 18. The wire member 75 is so constructed that it will sweep over the cam face of the rib 70 and force the latter upwardly against the bottom of the flange 20. At a midpoint in the cam face there is a recess 76 provided, into which the wire member may drop and thereby releasably hold the wire member from further swinging movement. The inherent resiliency of the wire member will cause it to engage in the recess 76 and lock itself therein without further assistance.

Another important feature of the invention relates to the disposition of the parts so that the testing device may be held in the hands of the operator and at the same time controlled by him without difficulty. One such feature is the location of the valve control 58 adjacent to the part which is grasped by the hands of the operator. This enables the operator not only to grasp the part 38 with his hand but also control the operation of the device from the fingers of the hand holding such part. As shown in Fig. 7 the operator may grip the part 38 to insert the device in a milk can holding the same therein and simultaneously with a finger of the hand grasping the part 38 to operate the valve 58. This is a highly convenient way of controlling the operation of the device and increases speed of the testing device so that as milk cans are continuously advanced upon a conveyor the inspector may test one after the other without interfering or stopping the conveyor system.

The various steps in the operation of the device are illustrated in Figs. 7 to 10. Without the filter pad and holder assembled upon the bottom end, the container 12 of the device is grasped as shown in Fig. 7 and inserted into a milk can. When placed against the bottom of the milk can the valve member 22 is unseated and milk will flow into the milk collecting chamber 10 filling the same substantially full of milk. Although the valve is unseated no milk will flow into the chamber 10 until the air therein is allowed to escape. This is conveniently accomplished by merely depressing the control valve 58 by one of the fingers of the hand grasping the part 38. Upon withdrawal of the device from the can the spring 30 automatically returns the valve to valve closing position capturing the milk within the chamber 10.

After the device is completely withdrawn from the milk can the holder 64 containing a filter pad 34 therein is seated over the opening 18 as shown in Figs. 8 and 9. This may be done without requiring the operator to move his grasp from the part 38. With the same hand that fits the holder over the opening 18 the operator may swing the wire member 75 over the cam face in position to releasably lock the holder on the end of the container. The device is then reinserted in the milk can as shown in Fig. 10 and upon squeezing the bulb 50 air is forced down the hollow rod 14 to expel the milk from the opening 18. As previously explained the positioning of the filter pad holder on the end of the container automatically unseats the valve 22 so that the milk is free to discharge from the opening 18. Even so, it is necessary to use force to discharge the milk from the collecting chamber 10 because valve control 58 has sealed the rod and the top of the chamber 10 against admission of air. After this operation the filter pad is removed from the holder and inspected.

In Fig. 11 I show a modification of the invention wherein an air pressure unit generally indicated at 80 is provided for producing the necessary air pressure to discharge the milk from the collecting chamber 10. This is a highly desirable feature when continuous inspections must be made by the same operator and relieves the operator of the necessity of manually squeezing the bulb 50 to discharge the milk. As shown in Fig. 11 the bulb is removed and the tube 48 communicates with the air pressure unit 80 by means of a flexible tube 82 and in addition to automatically providing pressure to drive the milk from the collecting chamber 10, the power unit 80 also serves to assist in inducing milk to enter the collecting chamber and thereby speed up the testing operation.

Referring to Fig. 12 the arrangement of the passages 40 to 46 is the same as that previously described but a new fitting 84 has been substituted for the previously described fitting 52. This new fitting 84 simply consists of a nut having a central aperture 86 which opens communication between the passages 40 and 44 to the atmosphere.

In the operation of this embodiment of the invention, the air compressor unit 80 is constantly operated and without any obstruction over the opening 86 of the nut 84 the air pressure normally escapes therethrough. The manner in which the passages 40 and 44 come together in the widened opening 42 produces an aspirating effect tending to induce air in the passage 40 and in the chamber 10 to flow out with the fast moving mass of air discharging from the passage 44 through the fitting 84. Thus when the device is first inserted in a milk can and valve 22 opened by engagement with the bottom thereof the aspirating effect reduces the air pressure in the milk chamber and causes the milk to flow into the opening 18 very rapidly. Consequently this step in the testing operation is speeded up.

The device is then removed from the milk can and the filter pad assembled on the end of the container in the manner shown in Figs. 8 and 9. Upon reinsertion of the device in the mouth of the milk can as shown in Fig. 10 the operator need only place his fingers over the opening 86 and the pressure built up by the power unit 80 is caused to be turned downwardly into the passage 40 and through the hollow rod 14. As a result the milk in the collecting chamber 10 is forced to be quickly discharged from the end of the container.

For convenience in operating either modification, it is preferable to have the locking wire frame 75 for the filter pad holder swingable about an axial perpendicular to the plane in which the valve associated with the handle extends. That is, when the device is held as shown in Fig. 8 with the valve 58 (or 84) in a vertical plane, the wire frame 75 is swingable up and down about a horizontal axis. This is a highly convenient way to operate the device. To insure that the parts are in this position even after considerable use, a lock nut 88 is threaded to the pipe 14 immediately above the boss 34 on the container 12 and its position is adjustable to pre-set the container 12 on the pipe 14 with the axis of the wire frame extending in the desired plane.

What I claim is:

1. A testing device of the class described comprising, in combination, a container for receiving and holding milk having an opening for admission and discharge of milk into and from the container, a valve member normally closing said opening having a part projecting from the opening beyond the container and adapted upon abutment against an outside object to cause the member to move to open position, spring means inside the container acting to force said member to valve closing position, a hollow rod having one end attached to said container and having its interior opening into the interior of said container, a hand grasping part attached to the other end of the rod and having a passage therethrough communicating with the hollow interior of the rod, means for introducing fluid under pressure into the outer end of said passage, said part having an atmospheric port provided with one branch leading to the passageway through the part and with a second branch leading to the passageway through the rod and a plug having an atmospheric opening therethrough received within said port, and a normally closed manually controlled valve means for opening the port.

2. A testing device of the character described comprising, in combination, a substantially closed container for receiving and holding a quantity of liquid having an opening in the bottom wall thereof for the admission and discharge of the liquid, a valve member in the container adapted to extend across the opening and close the same, said member having a part projecting through the opening to the outside of the container and adapted to be brought up against an outside object to cause the valve to move away from the opening to allow the admission and discharge of liquid into and from the container, a valve stem on said member projecting inwardly therefrom away from the opening and terminating closely adjacent to the top wall of the container, said valve stem being adapted to abut said top wall and serve as a stop limiting the opening movement of the valve member, a coiled spring encircling said valve stem and arranged to exert a yielding force tending to close the valve member over the opening, a pipe-like member secured to the top wall of the container and having its interior opening into communication with the interior of the container, a hand grip part secured to the outer end of said pipe member and having a passage therethrough communicating with the passage through the pipe, means for introducing fluid under pressure into the outer end of said passage, said part having an atmospheric port leading to the passage through said part and to the interior of the pipe-like member, an air vent plug received within said port and a manually operable valve spring held to its seat mounted within said plug and controlling air flow therethrough.

3. A device of the character described comprising, in combination, a long hollow rod, a container on the bottom end of said rod having its interior in open communication with the interior of the rod, a hand grip part on the upper end of the rod having a passage therethrough communicating with the interior of the rod, means for introducing fluid under pressure into the upper end of said passage, means under manual control for venting the interior of the rod to atmosphere, said container having an opening in the bottom side thereof for the admission and discharge of liquid, a valve member in the container adapted to seat on the margins of said opening to close the same, said valve member having a part projecting through said opening to the outside of the container and adapted when struck against an outside object to lift the valve member off its seat, a filter pad holder adapted to be placed over the opening below the bottom side of the container, said filter pad holder having a downwardly projecting cam surface, and means attached to the container adapted to pass below the holder and engage the cam surface thereof and force the holder upwardly tight against the bottom of the container, and means on the holder adapted to abut said projecting part of the valve member as it is raised tightly against the container and unseat the valve member.

GEORGE BERNHARD ROESCH.